US012655776B1

(12) United States Patent
Ranjbar-Irani

(10) Patent No.: US 12,655,776 B1
(45) Date of Patent: Jun. 16, 2026

(54) METHOD AND APPARATUS FOR IMPELLER RETENTION DURING ASSEMBLY OF A TURBINE ENGINE

(71) Applicant: Pratt & Whitney Canada Corp., Longueuil (CA)

(72) Inventor: Nasser Ranjbar-Irani, Richmond Hill (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 19/343,751

(22) Filed: Sep. 29, 2025

(51) Int. Cl.

| | |
|---|---|
| ***F01D 25/28*** | (2006.01) |
| ***F04D 19/00*** | (2006.01) |
| ***F04D 29/60*** | (2006.01) |

(52) U.S. Cl.
CPC ......... *F01D 25/285* (2013.01); *F04D 19/002* (2013.01); *F04D 29/601* (2013.01); *F05D 2220/323* (2013.01); *F05D 2230/68* (2013.01); *F05D 2260/31* (2013.01); *F05D 2260/38* (2013.01)

(58) Field of Classification Search
CPC .... F01D 25/285; F04D 29/601; F04D 19/002; F05D 2230/323; F05D 2230/68; F05D 2260/31; F05D 2260/38
See application file for complete search history.

(56) References Cited

U.S. PATENT DOCUMENTS

| | | | | |
|---|---|---|---|---|
| 3,056,369 | A * | 10/1962 | Roth | F04D 29/34 269/45 |
| 4,491,307 | A * | 1/1985 | Ellefson | B23K 37/053 269/287 |
| 8,167,287 | B2 * | 5/2012 | Horiuchi | F01D 25/285 269/6 |
| 8,726,477 | B2 * | 5/2014 | Swiderski | F01D 25/285 269/54.1 |
| 9,126,294 | B2 | 9/2015 | Virkler et al. | |
| 10,837,645 | B2 * | 11/2020 | Merlau | B25B 5/147 |
| 10,989,413 | B2 * | 4/2021 | Hanson | F01D 25/285 |
| 2024/0293838 | A1 | 9/2024 | Domingues | |
| 2025/0354502 | A1 * | 11/2025 | Zhang | F01D 25/24 |

FOREIGN PATENT DOCUMENTS

| | | | | |
|---|---|---|---|---|
| CN | 210160636 U | * | 3/2020 | |
| KR | 101862947 B1 | * | 5/2018 | F01D 9/023 |

* cited by examiner

*Primary Examiner* — Eldon T Brockman
(74) *Attorney, Agent, or Firm* — Getz Balich LLC

(57) ABSTRACT

A translation-limiting member is provided for a retention ring of an assembly fixture. The translation-limiting member includes a coupling feature configured to couple the translation-limiting member to the retention ring at a location corresponding to a retaining finger. The retaining finger is slidably engaged at a top surface of the retention ring for radial translation, with respect to a center of the retention ring, between an extended position and a retracted position. The translation-limiting member also includes a first surface disposed substantially perpendicular to the top surface of the retention ring. The first surface is configured to directly abut a second surface of the retaining finger in the extended position and block the radial translation of the retaining finger.

20 Claims, 8 Drawing Sheets

METHOD AND APPARATUS FOR IMPELLER RETENTION DURING ASSEMBLY OF A TURBINE ENGINE

TECHNICAL FIELD

This disclosure relates generally to a turbine engine and, more particularly, to a method and an apparatus for impeller retention during compressor or rotor assembly of the turbine engine.

BACKGROUND OF THE ART

A gas turbine engine may include one or more rotor or compressor assemblies. Such assemblies may include one or more impellers. Various apparatuses and methods for retaining an impeller during rotor or compressor assembly are known in the art. While these known retaining methods and apparatuses have various benefits, there is always room in the art for improvement.

SUMMARY

According to an aspect of the present disclosure, a translation-limiting member is provided for a retention ring of an assembly fixture. The translation-limiting member includes a coupling feature configured to couple the translation-limiting member to the retention ring at a location corresponding to a retaining finger. The retaining finger is slidably engaged at a top surface of the retention ring for radial translation, with respect to a center of the retention ring, between an extended position and a retracted position. The translation-limiting member also includes a first surface disposed substantially perpendicular to the top surface of the retention ring. The first surface is configured to directly abut a second surface of the retaining finger in the extended position and block the radial translation of the retaining finger.

In any of the aspects or embodiments described above and herein, the translation-limiting member may further include a plate having an upper side and a lower side. The lower side may be configured to be disposed on a surface the retaining finger substantially parallel with the top surface of the retention ring. The translation-limiting member may further include a protrusion extending from the lower side of the plate and configured to fit within a slot extending along a radial length of the retaining finger in the extended position. The protrusion may include a first side surface extending substantially perpendicularly from the lower side of the plate. The first surface of the translation-limiting member may include at least a portion of the first side surface of the protrusion. The second surface of the retaining finger may include at least a portion of an inner surface of the slot.

In any of the aspects or embodiments described above and herein, a shape of the protrusion may correspond to an exposed portion of the slot with the retaining finger in the extended position.

In any of the aspects or embodiments described above and herein, the translation-limiting member may further include an aperture through the plate. The coupling feature of the translation-limiting member may include the aperture. The aperture may be configured to a receive a locking screw. The locking screw may couple the plate, the retaining finger, and the retention ring, via the aperture and the slot, with the protrusion disposed within the exposed portion of the slot.

In any of the aspects or embodiments described above and herein, the translation-limiting member may further include a plate slidably coupled to the top surface of the retention ring and having a radially inward side surface, with respect to the center of the retention ring. The plate may be configured to slide along a radially outward side surface of the retaining finger in the extended position, with respect to the center of the retention ring. The first surface of the translation-limiting member may include at least a portion of the radially inward side surface.

The second surface of the retaining finger may include at least a portion of the radially outward side surface of the retaining finger.

In any of the aspects or embodiments described above and herein, the translation-limiting member may further include at least one lateral slot extending along a length of the plate, and a sliding fastener disposed through the at least one lateral slot, coupling the plate to the retention ring. The coupling feature of the translation-limiting member may include the sliding fastener and the at least one lateral slot. The sliding fastener may enable sliding movement of the plate on the top surface of the retention ring in a direction substantially perpendicular to the radial translation of the retaining finger.

In any of the aspects or embodiments described above and herein, the translation-limiting member may further include a central slot extending along the length of the plate and disposed substantially parallel with the at least one lateral slot, and a spring element having a first end and a second end. The first end may be coupled to the plate, and the second end may be coupled to a pin extending from the top surface of the retention ring within the central slot. The spring element may exert a force enabling the plate to slide along the radially outward side surface of the retaining finger in the extended position.

In any of the aspects or embodiments described above and herein, the translation-limiting member may further include a shank having a cylindrical surface and configured to fit within a hole in the retention ring. The hole may be disposed adjacent to a radially outward side surface of the retaining finger in the extended position, with respect to the center of the retention ring. The first surface of the translation-limiting member may include at least a portion of the cylindrical surface of the shank. The second surface of the retaining finger may include at least a portion of the radially outward side surface of the retaining finger.

In any of the aspects or embodiments described above and herein, the translation-limiting member may further include a handle disposed at a first end of the shank, and a ball-locking mechanism disposed at a second end of the shank. The ball-locking mechanism may be configured to lock the shank within the hole. The coupling feature of the translation-limiting member may include the ball-locking mechanism.

According to an aspect of the present disclosure, a retaining finger assembly is provided for a retention ring of an assembly fixture. The retaining finger assembly includes a retaining finger slidably engaged at a top surface of the retention ring for radial translation between an extended position and a retracted position, with respect to a center of the retention ring. The retaining finger assembly also includes a translation-limiting member having a coupling feature and a first surface disposed substantially perpendicular to the top surface of the retention ring. The coupling feature is configured to couple the translation-limiting member to the retention ring at a location corresponding to the retaining finger. The first surface is configured to directly abut a second surface of the retaining finger in the extended position and block the radial translation of the retaining finger.

In any of the aspects or embodiments described above and herein, the retaining finger may include a slot extending along a radial length of the retaining finger. The retaining finger assembly may further include a fastening device configured to slidably couple the retaining finger to the retention ring via the slot. The fastening device may include a locking screw or a spring-loaded bolt.

In any of the aspects or embodiments described above and herein, the slot may include an inner surface. The translation-limiting member may further include a plate having an upper side and a lower side. The lower side may be configured to be disposed on a surface of the retaining finger substantially parallel with the top surface of the retention ring. The translation-limiting member may further include a protrusion extending from the lower side of the plate and configured to fit within the slot of the retaining finger in the extended position. The protrusion may include a first side surface extending substantially perpendicularly from the lower side of the plate. The first surface of the translation-limiting member may include at least a portion of the first side surface of the protrusion, and the second surface of the retaining finger may include at least a portion of the inner surface of the slot.

In any of the aspects or embodiments described above and herein, a shape of the protrusion may correspond to an exposed portion of the slot with the retaining finger in the extended position.

In any of the aspects or embodiments described above and herein, the translation-limiting member may further include an aperture through the plate. The coupling feature of the translation-limiting member may include the aperture. The fastening device may couple the plate, the retaining finger, and the retention ring, via the aperture and the slot, with the protrusion disposed within the exposed portion of the slot.

In any of the aspects or embodiments described above and herein, the translation-limiting member may further include a plate slidably coupled to the top surface of the retention ring and having a radially inward side surface, with respect to the center of the retention ring. The plate may be configured to slide along a radially outward side surface of the retaining finger in the extended position, with respect to the center of the retention ring. The first surface of the translation-limiting member may include at least a portion of the radially inward side surface. The second surface of the retaining finger may include at least a portion of the radially outward side surface of the retaining finger.

In any of the aspects or embodiments described above and herein, the translation-limiting member may further include at least one lateral slot extending a long a length of the plate, and a sliding fastener disposed through the at least one lateral slot, coupling the plate to the retention ring. The coupling feature of the translation-limiting member may include the sliding fastener and the at least one lateral slot. The sliding fastener may enable sliding movement of the plate on the top surface of the retention ring in a direction substantially perpendicular to the radial translation of the retaining finger.

In any of the aspects or embodiments described above and herein, the translation-limiting member may further include a central slot extending along the length of the plate and disposed substantially parallel with the at least one lateral slot, and a spring element having a first end and a second end. The first end may be coupled to the plate, and the second end may be coupled to a pin extending from the top surface of the retention ring within the central slot. The spring element may exert a force enabling the plate to slide along the radially outward side surface of the retaining finger in the extended position.

In any of the aspects or embodiments described above and herein, the translation-limiting member may further include a shank having a cylindrical surface and configured to fit within a hole in the retention ring. The hole may be disposed adjacent to a radially outward side surface of the retaining finger in the extended position, with respect to the center of the retention ring. The first surface of the translation-limiting member may include at least a portion of the cylindrical surface of the shank. The second surface of the retaining finger may include at least a portion of the radially outward side surface of the retaining finger.

In any of the aspects or embodiments described above and herein, the translation-limiting member may further include a handle disposed at a first end of the shank, and a ball-locking mechanism disposed at a second end of the shank. The ball-locking mechanism may be configured to lock the shank within the hole. The coupling feature of the translation-limiting member may include the ball-locking mechanism.

According to an aspect of the present disclosure, a retention ring of an assembly fixture for a gas turbine engine is provided. The retention ring includes a top surface having an inner perimeter and an outer perimeter, and a plurality of retaining fingers disposed circumferentially around the top surface and at least partially between the inner perimeter and the outer perimeter. Each of the plurality of retaining fingers is slidably engaged with the top surface for radial translation, with respect to a center of the retention ring, between an extended position and a retracted position. The retention ring also includes at least one translation-limiting member having a coupling feature and a first surface disposed substantially perpendicular to the top surface. The coupling feature is configured to couple the translation-limiting member to the retention ring at a location corresponding to a respective retaining finger of the plurality of retaining fingers. The first surface is configured to directly abut a second surface of the respective retaining finger in the extended position and block the radial translation of the respective retaining finger.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
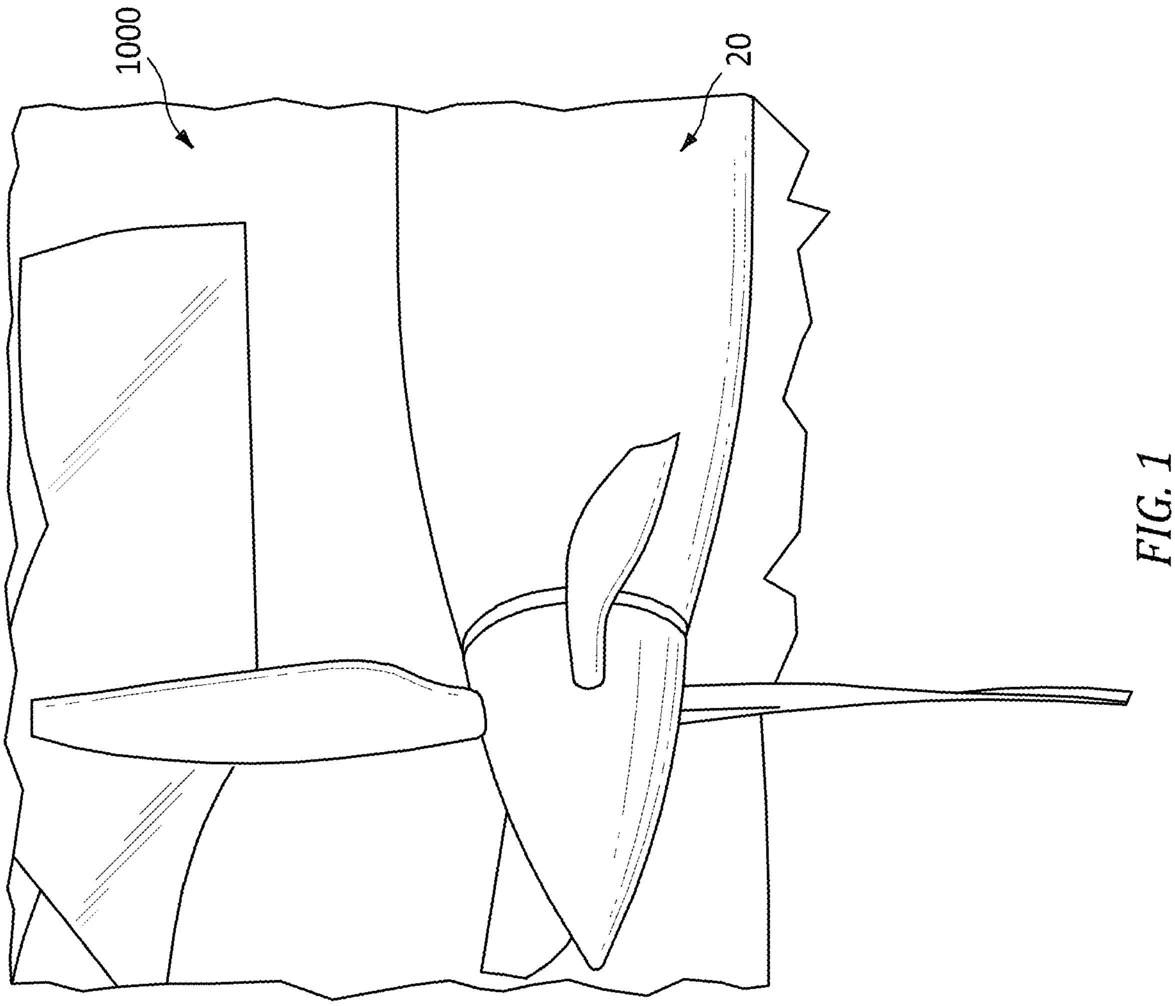
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
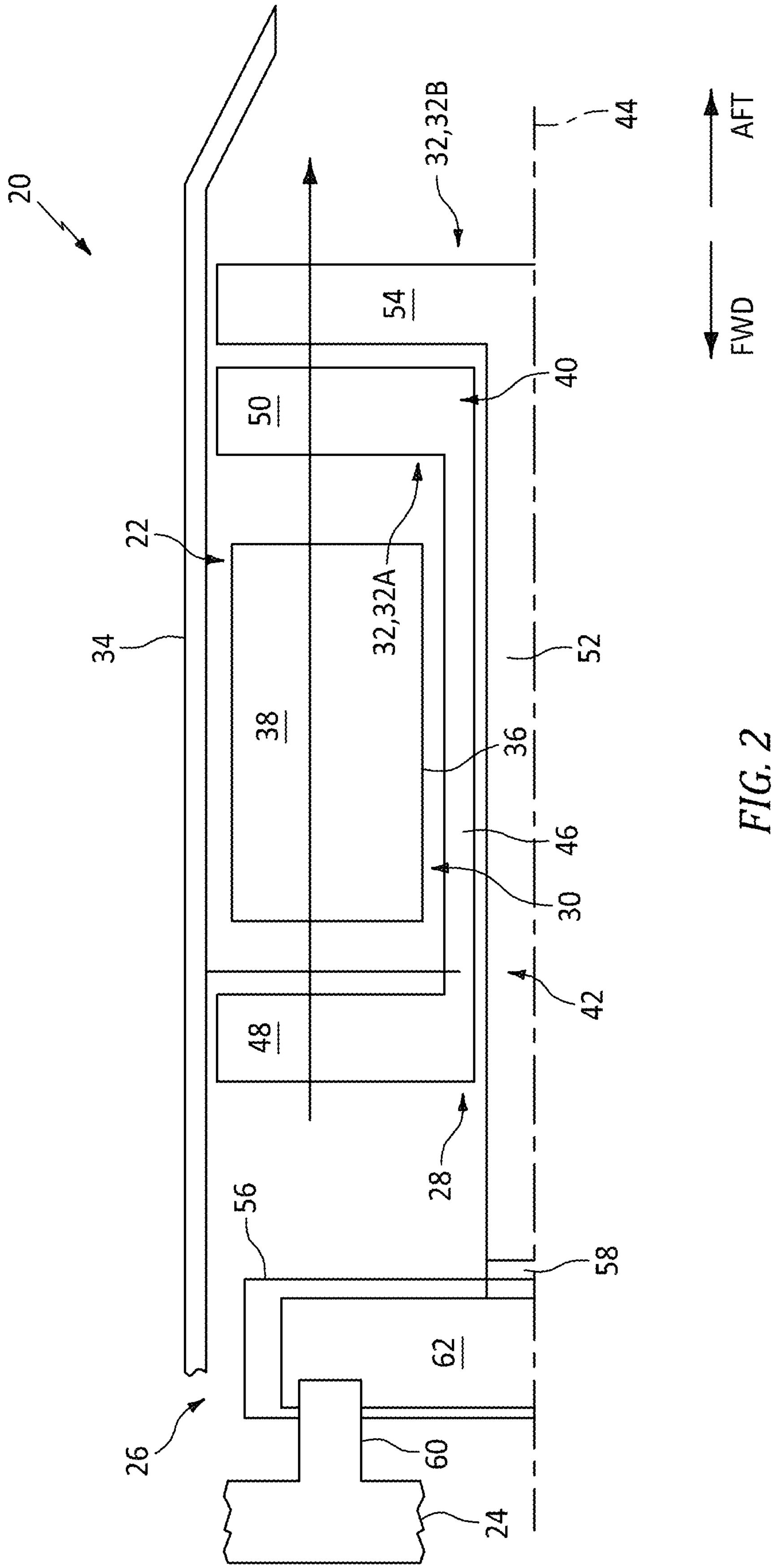
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, a propulsor 24, and a drivetrain 26. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, or other intermittent combustion engines.

The engine 22 of FIG. 2 includes a compressor section 28, a combustor section 30, a turbine section 32, and an engine static structure 34. The combustor section 30 includes a combustor 36 (e.g., an annular combustor) forming a combustion chamber 38. The turbine section 32 includes a high-pressure turbine 32A and a power turbine 32B.

Components of the compressor section 28 and/or the turbine section 32 of FIG. 2 form a first rotational assembly 40 (e.g., a high-pressure spool) and a second rotational assembly 42 of the engine 22. The first rotational assembly 40 and the second rotational assembly 42 are mounted for rotation about an axial centerline 44 (e.g., a rotational axis) of the engine 22 relative to the engine static structure 34.

The first rotational assembly 40 includes a first shaft 46, a bladed compressor rotor 48 for the compressor section 28, and a bladed first turbine rotor 50 for the high-pressure turbine 32A. The first shaft 46 interconnects the bladed compressor rotor 48 and the bladed first turbine rotor 50.

The second rotational assembly 42 of FIG. 2 includes a second shaft 52 (e.g., an engine output shaft) and a bladed second turbine rotor 54 for the power turbine 32B. The second shaft 52 is connected to the bladed second turbine rotor 54. The second shaft 52 is coupled to the propulsor 24 by the drivetrain 26.

The drivetrain 26 includes a gearbox 56 (e.g., a reduction gearbox (RGB)), a first input shaft 58, and an output shaft 60 (e.g., a propulsor output shaft or a propeller shaft). The gearbox 56 includes and houses a gear assembly 62. The gear assembly 62 couples the first input shaft 58 with the output shaft 60. For example, the gear assembly 62 may be a reduction gear assembly configured to drive rotation of the output shaft 60 at a reduced rotational speed relative to the first input shaft 58. The first input shaft 58 is coupled to (e.g., mounted on) the second shaft 52, and interconnects the second shaft 52 with the gear assembly 62. The output shaft 60 is coupled to (e.g., mounted on) the propulsor 24, and interconnects the propulsor 24 with the gear assembly 62.

The engine static structure 34 includes engine casings, cowlings, and other fixed (e.g., non-rotating) structures of the engine 22 which form, house, and/or support components of the engine 22 such as, but not limited to, those of the compressor section 28, the combustor section 30, and the turbine section 32. The engine static structure 34 may include one or more bearing assemblies configured to rotationally support components of the first rotational assembly 40 and the second rotational assembly 42.

During assembly of the engine 22, the compressor rotor and associated components may be removed from mainline tooling and placed on a dedicated rotating assembly fixture or stand. The assembly fixture is used repeatedly during the compressor assembly process. For example, it may be engaged at least three separate times during coupling and subassembly operations. Therefore, the assembly fixture must reliably retain an impeller, for example, and any associated subcomponents through multiple handing events. Turbine sections may have a similar assembly process in some engines.

Figure 3:
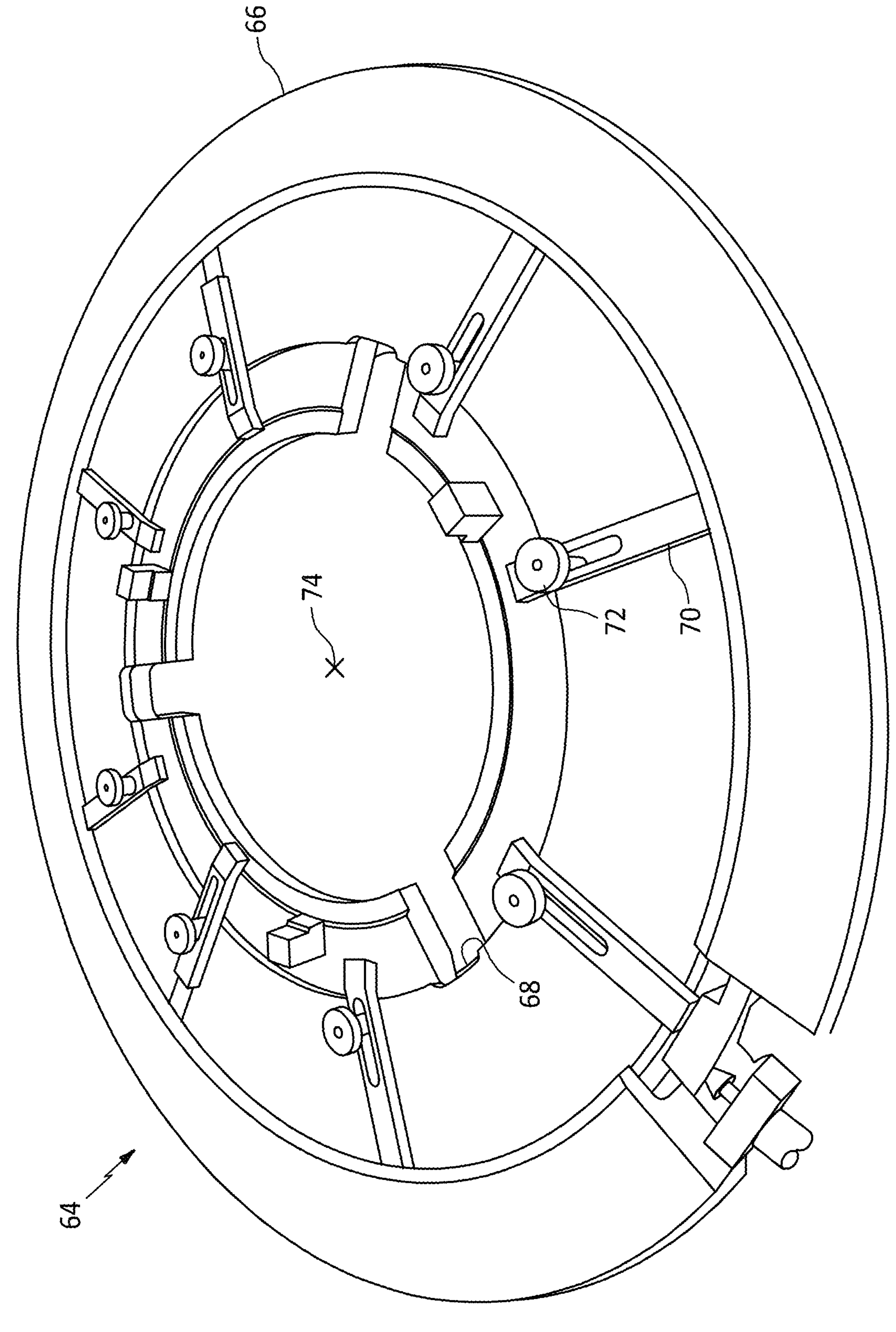
FIG. 3 schematically illustrates a top, perspective view of a circumferential retention ring of an assembly fixture, in accordance with one or more embodiments of the present disclosure.

FIG. 3 schematically illustrates a top, perspective view of a circumferential retention ring 64 of the assembly fixture. The assembly fixture may axially translate and rotate the retention ring 64 to allow technicians to position and secure components at different heights and angular orientations. The retention ring 64 includes an outer perimeter 66, an inner perimeter 68, and a plurality of retaining fingers 70 (e.g., finger-style inserts). The retaining fingers 70 are coupled to the retention ring 64 by a fastening device, such as a threaded locking screw 72 (e.g., a thumbscrew). The retaining fingers 70 are equally spaced about the circumference of the retention ring 64, at least partially between the outer perimeter 66 and the inner perimeter 68. Each retaining finger 70 has a radial orientation directed toward a center 74 of the retention ring 64. Each retaining finger 70 is moveable between at least a retracted position and an extended position. The present disclosure is not limited to a particular size or type of the retention ring 64. The present disclosure is also not limited to a particular number of retaining fingers 70.

Figure 4B:
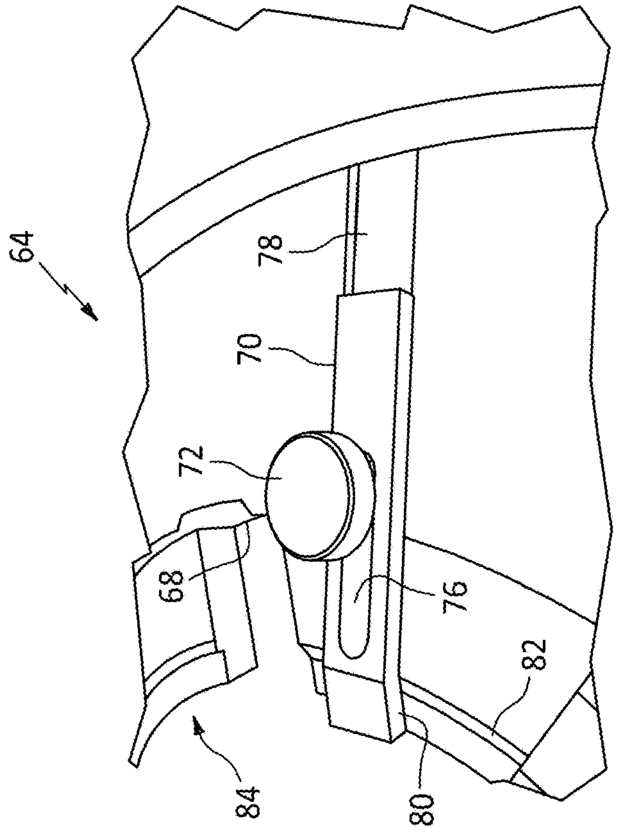
FIG. 4B schematically illustrates a partial, perspective view of the retention ring with the retaining finger in an extended position engaged with an engine component, in accordance with one or more embodiments of the present disclosure.
Figure 4A:
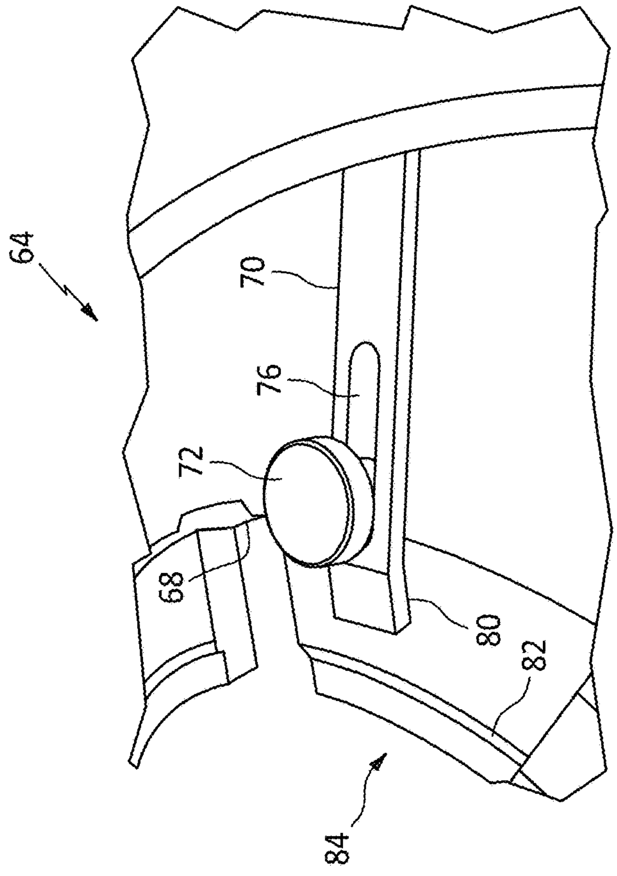
FIG. 4A schematically illustrates a partial, perspective view of the retention ring with a retaining finger in a retracted position, in accordance with one or more embodiments of the present disclosure.

FIG. 4A schematically illustrates a partial, perspective view of the retention ring 64 with the retaining finger 70 in a retracted position. FIG. 4B schematically illustrates a partial, perspective view of the retention ring 64 with the retaining finger 70 in an extended position. The retaining finger 70 includes a slot 76 that extends along a radial length of the retaining finger 70, with respect to the center 74 of the retention ring 64. The locking screw 72 extends through the slot 76 in the retaining finger 70, into the retention ring 64. The locking screw 72 is tightened to secure the retaining finger 70 in the retracted position of FIG. 4A or the extended position of FIG. 4B. The locking screw 72 is loosened to allow the retaining finger 70 to slide within a track 78 on a surface of the retention ring 64, between the retracted position of FIG. 4A and the extended position of FIG. 4B. The track 78 extends in a same radial direction as the retaining finger 70, with respect to the center 74 of the retention ring 64. The retaining finger 70 is disposed at least partially within the track 78 in both the retracted position and the extended position. The present disclosure is not limited to particular size and dimensions of the retaining finger 70 and the slot 76.

As shown in FIG. 4A, in the retracted position, the retaining finger 70 is disposed radially outward within the track 78, such that an exposed portion of the slot 76 is disposed on a radially outer side of the locking screw 72, with respect to the center 74 of the retention ring 64. An inner radial end 80 of the retaining finger 70 extends beyond the inner perimeter 68 of the retention ring 64, and projects downwardly within the inner perimeter 68. As shown in FIG. 4B, in the extended position, the retaining finger 70 is disposed radially inward within the track 78, such that an exposed portion of the slot 76 is disposed on a radially inner side of the locking screw 72, with respect to the center 74 of the retention ring 64. The inner radial end 80 of the retaining finger 70 projects downwardly to engage a groove or recess 82 of an engine component 84 disposed within the inner perimeter 68 of the retention ring 64, thereby retaining the engine component 84 while the retention ring 64 is translated and rotated by the assembly fixture. The present disclosure is not limited to a particular orientation of the inner radial end 80 of the retaining finger 70.

Because the assembly fixture may be used at different stages of engine assembly, the weight and load at the retention ring 64 and the retaining fingers 70 may vary depending on what subassembly is present and at what stage the assembly fixture is employed. Retention at the retaining fingers 70 relies on the locking screw 72 that clamps the retaining finger 70 in place on the retention ring 64. These friction-based locking arrangements may be prone to loss of clamp load over time, and they may limit the torque that a technician is able to apply. Further, when the retention ring 64 is inverted, handling of the retaining fingers 70 and the locking screw 72 becomes ergonomically awkward.

The conditions described above increase the risk that the friction-only locking mechanism of the locking screws 72 will relax or that the retaining finger 70 will inadvertently release from its engaged position. Such an inadvertent release may cause the engine component 84 to drop, potentially causing damage, requiring rework, or creating safety hazards.

Figure 5A:
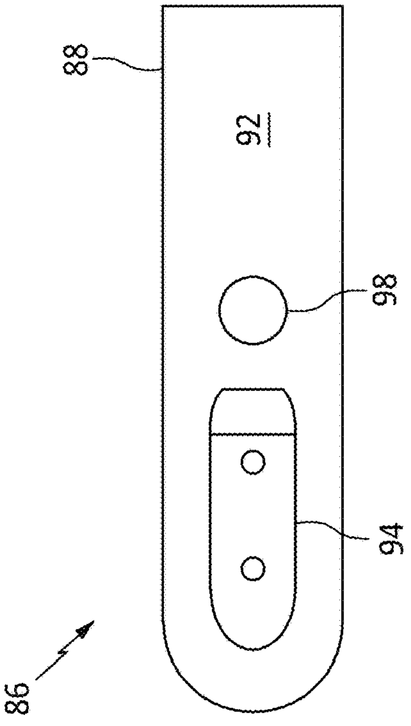
FIG. 5A schematically illustrates a bottom view of a translation-limiting member for the retention ring, in accordance with one or more embodiments of the present disclosure.
Figure 5B:
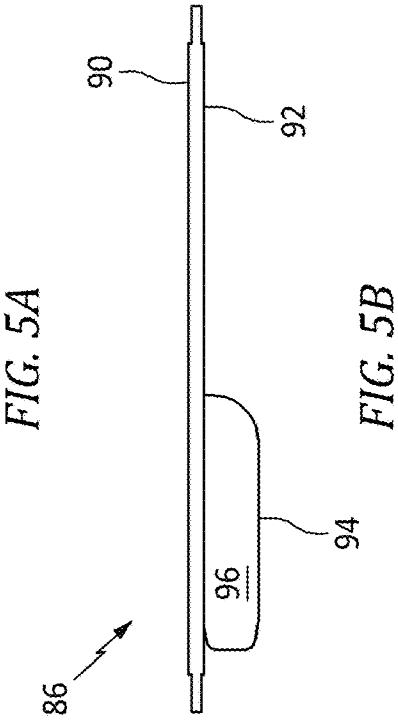
FIG. 5B schematically illustrates a side view of the translation-liming member for the retention ring, in accordance with one or more embodiments of the present disclosure.

FIG. 5A schematically illustrates a bottom view of a translation-limiting member for the retention ring 64. FIG. 5B schematically illustrates a side view the translation-limiting member for the retention ring 64. The translation-limiting member is embodied as a locking tab 86 that includes a plate 88 having a top side 90 and a bottom side 92. A protrusion 94 extends from the bottom side 92. Sides 96 of the protrusion 94 may extend substantially perpendicularly from the bottom side 92. As used herein, the term "substantially" is intended to encompass arrangements or orientations that may also deviate from exact and that do not materially affect operation, function or performance. The protrusion 94 may have a shape that corresponds to an exposed portion of the slot 76 of the retaining finger 70, when the retaining finger 70 is disposed in the extended position. A coupling feature of the locking tab 86 includes an aperture 98 through the plate 88. The aperture 98 is disposed to receive and align with the locking screw 72 when the retaining finger 70 is disposed in the extended position and the protrusion 94 is disposed within the slot 76. Apart from the alignment with the locking screw 72 and the slot 76, the present disclosure is not limited to a particular size or shape of the locking tab 86, the protrusion 94, and the aperture 98.

Figure 6:
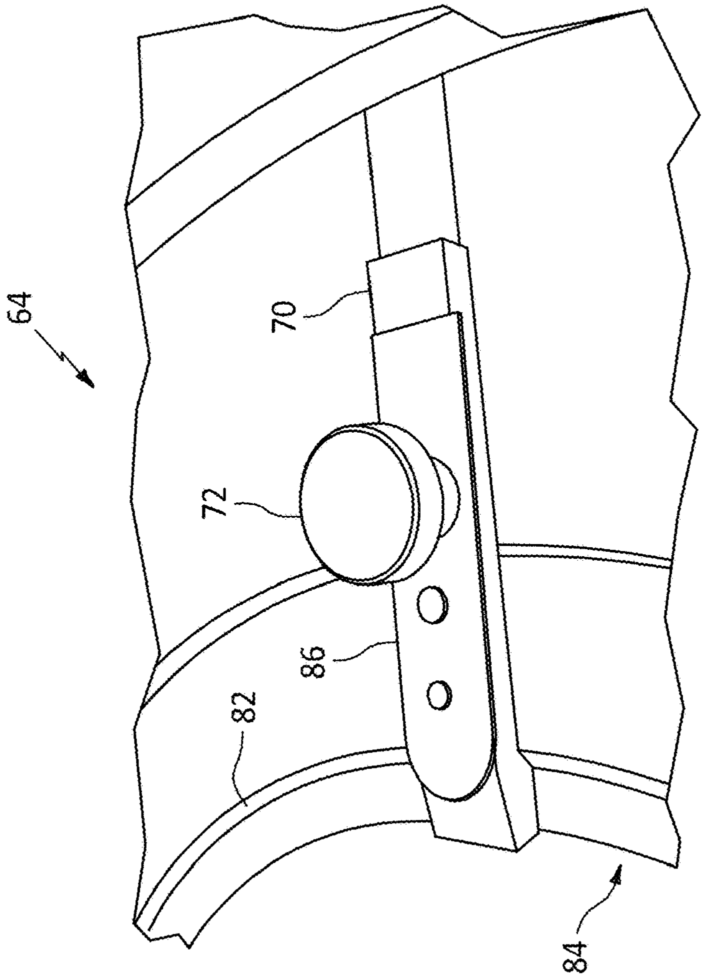
FIG. 6 schematically illustrates a partial perspective view of the retention ring with the translation-limiting member engaged with the retaining finger in the extended position, in accordance with one or more embodiments of the present disclosure.

FIG. 6 schematically illustrates a partial, perspective view of the retention ring 64 with the translation-limiting member engaged with the retaining finger 70 in the extended position. The locking tab 86 is disposed such that the protrusion 94 is disposed within the slot 76 radially inward of the locking screw 72, with respect to the center 74 of the retention ring 64. The locking screw 72 projects through the aperture 98 and the slot 76, and into the retention ring 64. The locking screw 72 may be tightened with the retaining finger 70 in the extended position, and the locking tab 86 prevents radial movement of the retaining finger 70 by blocking any possible movement of the slot 76 along the locking screw 72. For example, the sides 96 of the protrusion 94 directly abut inner sides of the slot 76 and the locking screw 72 within the slot 76, preventing movement of the retaining finger 70 with respect to the locking screw 72.

Figure 7B:
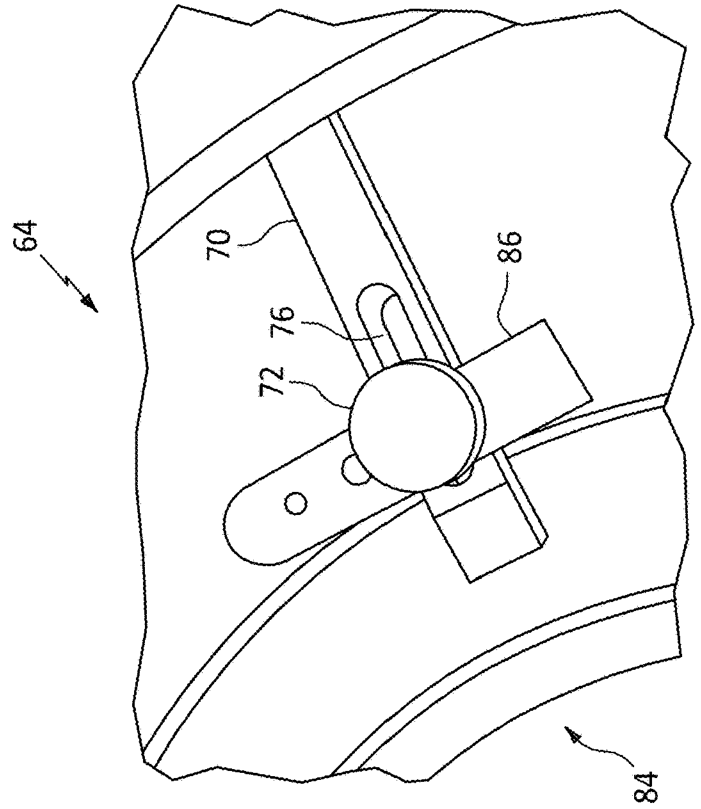
FIG. 7B schematically illustrates a partial, perspective view of the retention ring with the translation-limiting member disengaged from the retaining finger in the retracted position, in accordance with one or more embodiments of the present disclosure.
Figure 7A:
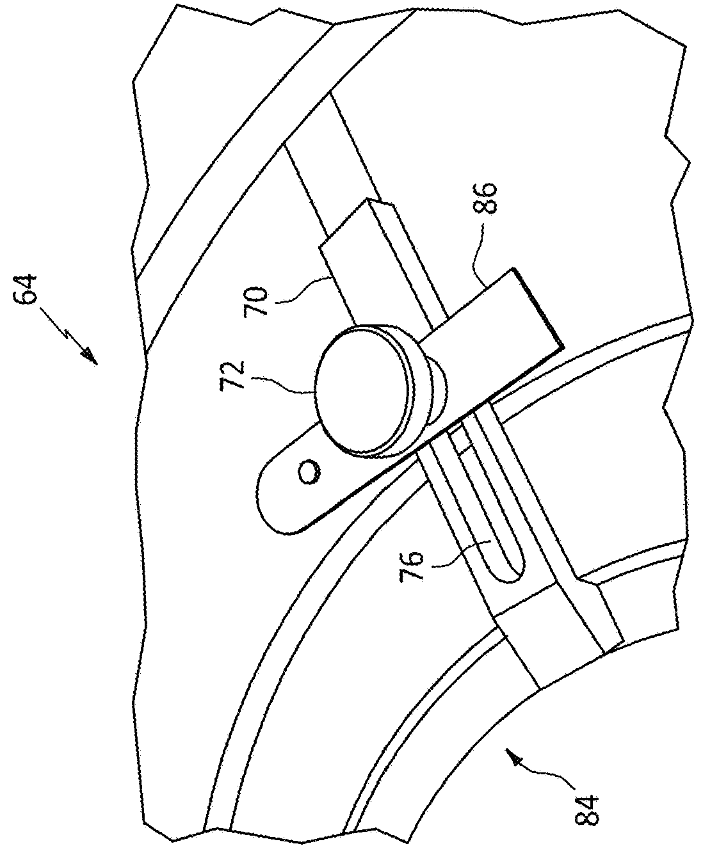
FIG. 7A schematically illustrates a partial, perspective view of the retention ring with the translation-limiting member disengaged from the retaining finger in the extended position, in accordance with one or more embodiments of the present disclosure.

FIG. 7A schematically illustrates a partial, perspective view of the retention ring 64 with the translation-limiting member disengaged from the retaining finger 70 in the extended position. In order to disengage the locking tab 86 from the retaining finger 70, the locking screw 72 is loosened, allowing the protrusion 94 to be lifted out from the slot 76. The locking tab 86 may then be rotated about the locking screw 72, such that the retaining finger 70 is free to slide radially outward via the slot 76. FIG. 7B schematically illustrates a partial, perspective view of the retention ring 64 with the translation-limiting member disengaged from the retaining finger 70 in the retracted position. The present disclosure is not limited to a particular amount of rotation to disengage the locking tab 86 from the retaining finger 70.

Figure 8:
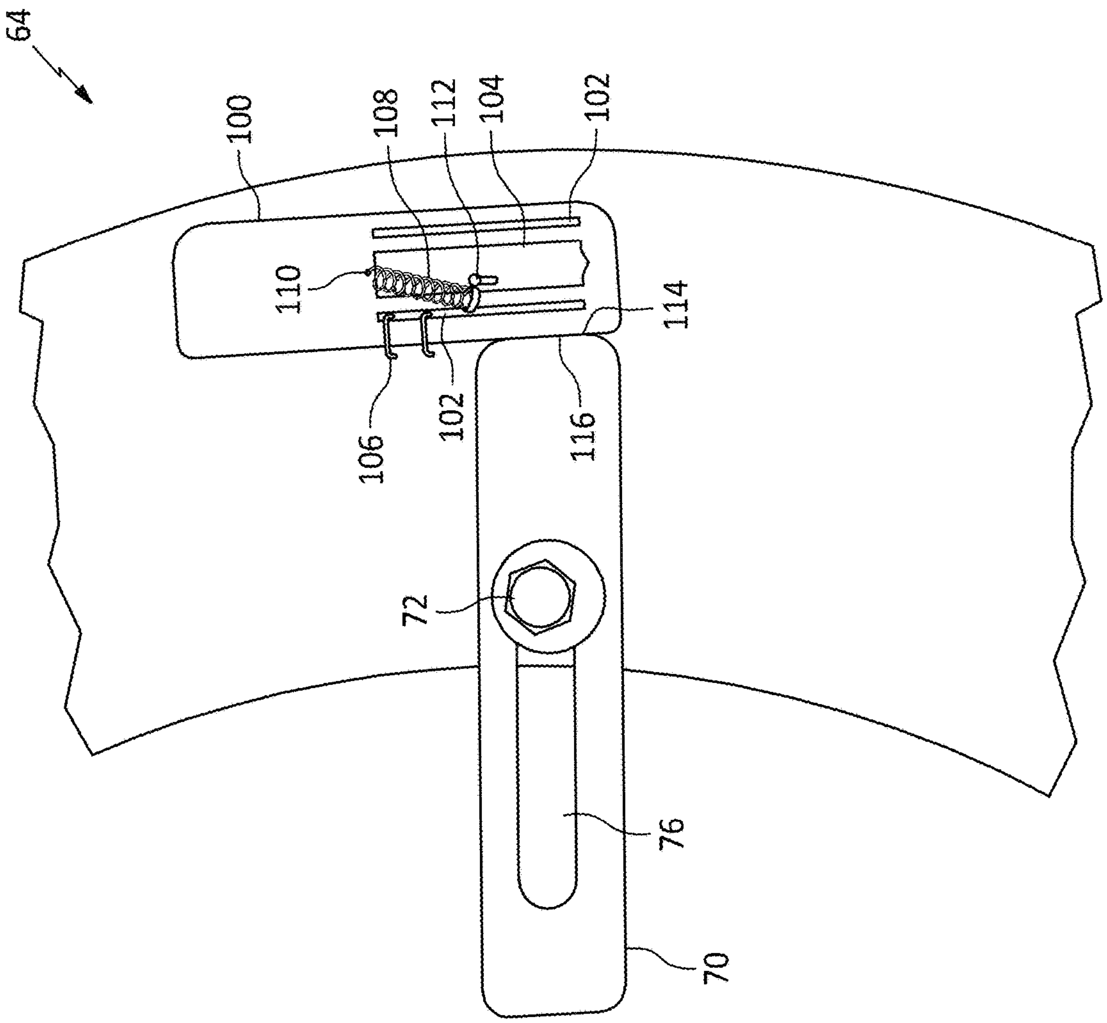
FIG. 8 schematically illustrates a partial, top view of the retention ring with a translation-limiting member engaged with the retaining finger in the extended position, in accordance with one or more embodiments of the present disclosure.

FIG. 8 schematically illustrates a partial, top view of the retention ring 64 with a translation-limiting member engaged with the retaining finger 70 in an extended position. The translation-limiting member is embodied as a spring-loaded plate 100 that includes at least one lateral slot 102 and a central slot 104. The at least one lateral slot 102 and the central slot 104 extend along a length of the spring-loaded plate 100 and are substantially parallel to each other. A coupling feature of the spring-loaded plate 100 includes at least one sliding fastener 106 disposed through the at least one lateral slot 102 into the top surface of the retention ring 64. This coupling enables the spring-loaded plate 100 to slide on the top surface of the retention ring 64 in a direction substantially perpendicular to the radial translation of the retaining finger 70. A first end of a spring element 108 is connected to a first connection point 110 on the spring-loaded plate 100 at an end of the central slot 104. A second end of the spring element 108 is coupled to a pin 112 that extends from the top surface of the retention ring 64. The pin 112 is disposed circumferentially adjacent to the track 78 and within the central slot 104 of the spring-loaded plate 100. The present disclosure is not limited to a particular size or orientation of the spring-loaded plate 100 and its components.

When the retaining finger 70 is moved to the extend position, the spring element 108 exerts a force on the spring-loaded plate 100 that pulls the spring-loaded plate 100 in a direction substantially perpendicular to and toward the retaining finger 70, such that at least a portion of a radially inward side surface 114 of the spring-loaded plate 100 directly abuts at least a portion of a radially outward side surface 116 of the retaining finger 70, with respect to the center 74 of the retention ring 64. The spring-loaded plate 100 acts as a mechanical barrier to keep the retaining finger 70 in the extended position. In order to move the retaining finger 70 to the retracted position, the spring-loaded plate 100 is pulled substantially perpendicularly away from the retaining finger 70, against the force of the spring element 108. When the radially inward side surface 114 of the spring-loaded plate 100 is no longer disposed directly against radially outward side surface 116 of the retaining finger 70, the retaining finger 70 may be slid to the retracted position in the manner described above. The spring-loaded plate 100 is disposed circumferentially adjacent to the retaining finger 70 in the retracted position.

The spring-loaded plate 100 may be composed of any material that may withstand the force of the retaining finger 70 in the extended state. For example, the spring-loaded plate 100 may be composed of metal, a polymer, or a ceramic. The spring-loaded plate 100 improves ergonomics by requiring only the retaining finger 70 to be moved into place and the locking thread to be tightened in the extended position.

Figure 9:
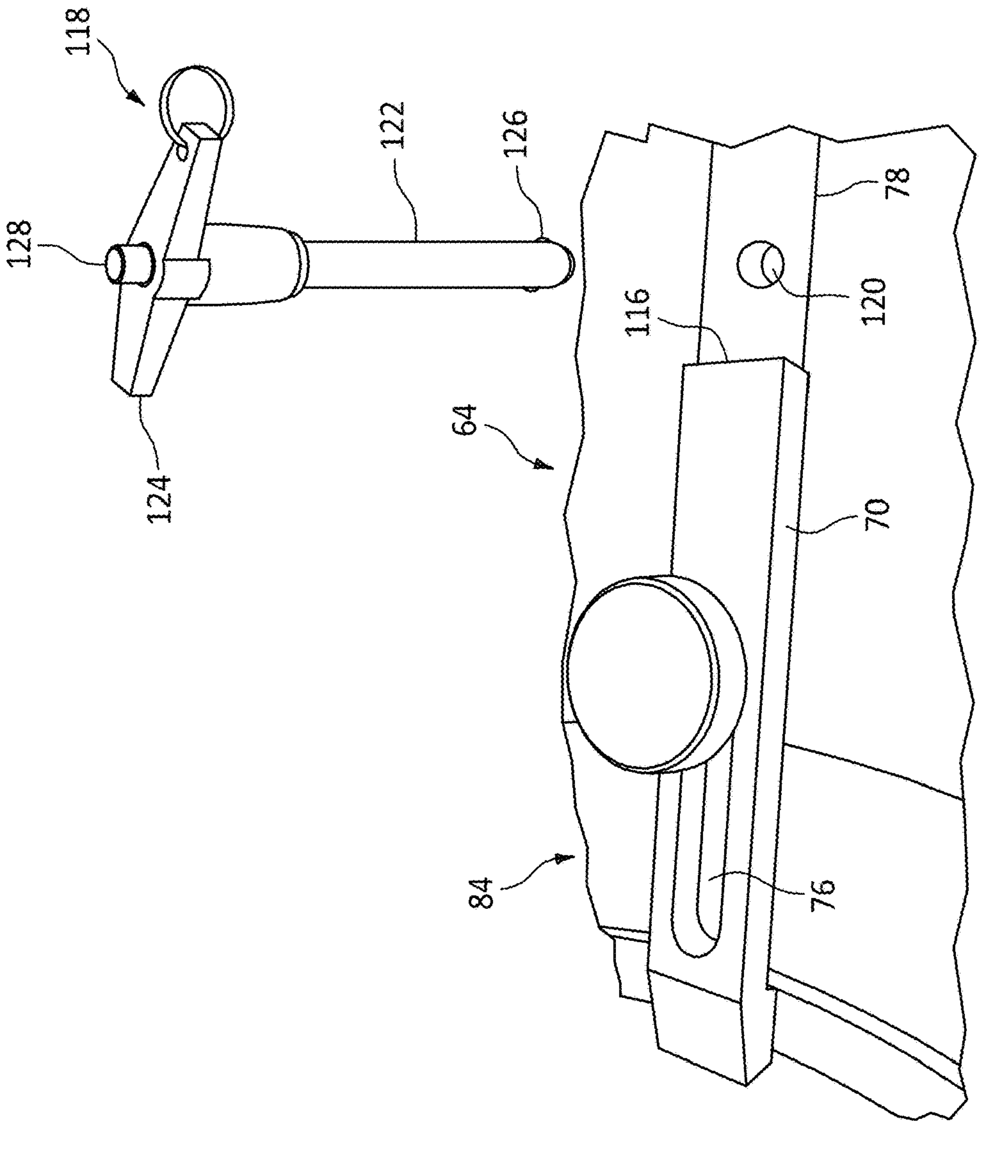
FIG. 9 schematically illustrates a partial, perspective view of the retention ring with a translation-limiting member and the retaining finger in the extended position, in accordance with one or more embodiments of the present disclosure.

FIG. 9 schematically illustrates a partial, perspective view of the retention ring 64 with a translation-limiting member and the retaining finger 70 in the extended position. The translation-limiting member is embodied as a ball-locking pin 118. A hole 120 is disposed in the track 78, through the retention ring 64, at a position adjacent to the radially outward side surface 116 of the retaining finger 70. With the retaining finger 70 in the extended position, the ball-locking pin 118 may be inserted into the hole 120. The ball-locking pin 118 acts as a mechanical barrier to keep the retaining finger 70 in the extended position. In order to move the retaining finger 70 to the retracted position, the ball-locking pin 118 is first removed from the hole 120 in the track 78. The present disclosure is not limited to a particular design of the ball-locking pin 118, or a particular size or shape of the hole 120 in the track 78.

The ball-locking pin 118 includes a shank 122 having a cylindrical surface. The cylindrical surface of the shank 122 is substantially perpendicular to the top surface of the retention ring 64, and at least a portion of cylindrical surface directly abuts at least a portion of the radially outward side surface 116 of the retaining finger 70, when the ball-locking pin 118 is disposed within the hole 120. The ball-locking pin 118 also includes a handle 124 at a first end of the shank, and balls 126 housed in a cavity at a second end of the shank 122. The ball-locking pin 118 further includes a spring mechanism to bias the balls 126 outward, and a button 128 on the handle 124 that activates the spring mechanism to retract the balls 126 into the shank 122 for insertion or removal of the ball-locking pin 118. This ball-locking mechanism is a coupling feature that couples the ball-locking pin 118 to the retention ring 64. The present disclosure is not limited to this particular configuration for the ball-locking pin 118.

Figure 10:
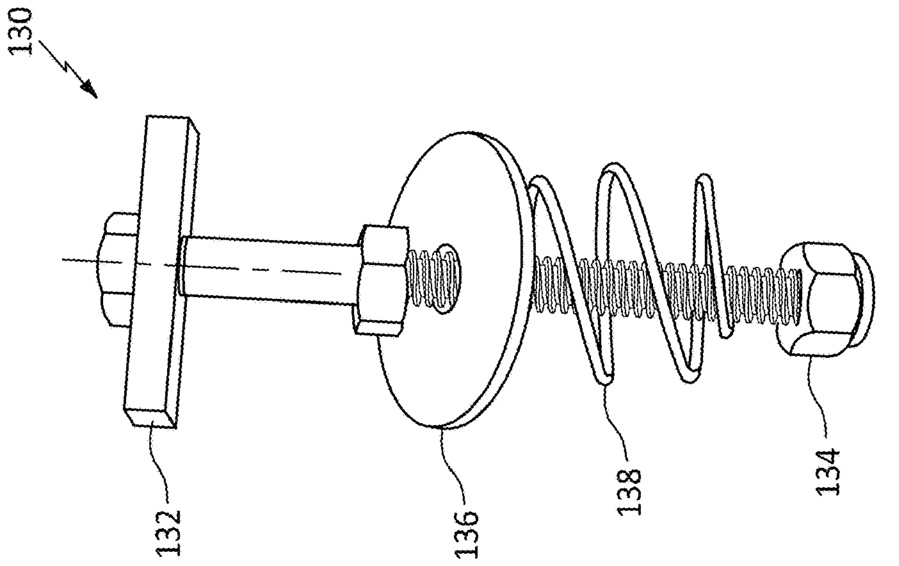
FIG. 10 schematically illustrates a side view of a spring-loaded bolt for securing the retaining finger to the retention ring, in accordance with one or more embodiments of the present disclosure.

FIG. 10 schematically illustrates a side view of a spring-loaded bolt 130 for securing the retaining finger 70 to the retention ring 64. The spring-loaded bolt 130 includes a handle 132 and a nut 134 at opposing ends of the spring-loaded bolt 130. A washer 136 is disposed below the handle 132, and a spring element 138 is disposed between the washer 136 and the nut 134. When the spring-loaded bolt 130 is in use, the spring-loaded bolt 130 is inserted through the slot 76 and through the retention ring 64 in place of the locking screw 72. The spring element 138 may be disposed directly above the retaining finger 70, or directly below the retention ring 64. The nut 134 secures the spring-loaded bolt 130 in place. The spring element 138 eliminates the need for rotational threading of the locking screw 72. The spring-loaded bolt 130 may be used in combination with any previous embodiment in place of the locking screw 72 to improve ergonomics of the retaining finger 70.

The spring-loaded bolt 130 does not require rotational motion. Instead, a pulling motion is applied to the handle 132 of the spring-loaded bolt 130 to reduce the pressure that is securing the retaining finger 70 in place on the retention ring 64. Releasing the spring-loaded bolt 130 reengages the pressure, securing the retaining finger 70 in the desired position on the retention ring 64. The spring-loaded bolt 130 improves ergonomics when the retention ring 64 is inverted. The spring-loaded bolt 130 may be composed of any material that meets the required strength for the coupling. For example, the spring-loaded bolt 130 may be composed of metal, ceramic, or a polymer. The present disclosure is not limited to a particular stiffness for the spring element 138.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises"

means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A translation-limiting member for a retention ring of an assembly fixture, the translation-limiting member comprising:

a coupling feature configured to couple the translation-limiting member to the retention ring at a location corresponding to a retaining finger, wherein the retaining finger is slidably engaged at a top surface of the retention ring for radial translation, with respect to a center of the retention ring, between an extended position and a retracted position; and a first surface disposed substantially perpendicular to the top surface of the retention ring, wherein the first surface is configured to directly abut a second surface of the retaining finger in the extended position and block the radial translation of the retaining finger.

2. The translation-limiting member of claim 1, further comprising:

a plate comprising an upper side and a lower side, wherein the lower side is configured to be disposed on a surface the retaining finger substantially parallel with the top surface of the retention ring; and a protrusion extending from the lower side of the plate and configured to fit within a slot extending along a radial length of the retaining finger in the extended position, wherein:

the protrusion comprises a first side surface extending substantially perpendicularly from the lower side of the plate;

the first surface of the translation-limiting member comprises at least a portion of the first side surface of the protrusion; and the second surface of the retaining finger comprises at least a portion of an inner surface of the slot.

3. The translation-limiting member of claim 2, wherein a shape of the protrusion corresponds to an exposed portion of the slot with the retaining finger in the extended position.

4. The translation-limiting member of claim 3, further comprising an aperture through the plate, wherein:

the coupling feature of the translation-limiting member comprises the aperture; and the aperture is configured to a receive a locking screw, wherein the locking screw couples the plate, the retaining finger, and the retention ring, via the aperture and the slot, with the protrusion disposed within the exposed portion of the slot.

5. The translation-limiting member of claim 1, further comprising:

a plate slidably coupled to the top surface of the retention ring and comprising a radially inward side surface, with respect to the center of the retention ring, wherein:

the plate is configured to slide along a radially outward side surface of the retaining finger in the extended position, with respect to the center of the retention ring;

the first surface of the translation-limiting member comprises at least a portion of the radially inward side surface; and the second surface of the retaining finger comprises at least a portion of the radially outward side surface of the retaining finger.

6. The translation-limiting member of claim 5, further comprising:

at least one lateral slot extending along a length of the plate; and a sliding fastener disposed through the at least one lateral slot, coupling the plate to the retention ring, wherein:

the coupling feature of the translation-limiting member comprises the sliding fastener and the at least one lateral slot; and the sliding fastener enables sliding movement of the plate on the top surface of the retention ring in a direction substantially perpendicular to the radial translation of the retaining finger.

7. The translation-limiting member of claim 6, further comprising:

a central slot extending along the length of the plate and disposed substantially parallel with the at least one lateral slot; and a spring element comprising a first end and a second end, wherein:

the first end is coupled to the plate, and the second end is coupled to a pin extending from the top surface of the retention ring within the central slot; and the spring element exerts a force enabling the plate to slide along the radially outward side surface of the retaining finger in the extended position.

8. The translation-limiting member of claim 1, further comprising:

a shank comprising a cylindrical surface and configured to fit within a hole in the retention ring, wherein:

the hole is disposed adjacent to a radially outward side surface of the retaining finger in the extended position, with respect to the center of the retention ring;

the first surface of the translation-limiting member comprises at least a portion of the cylindrical surface of the shank; and the second surface of the retaining finger comprises at least a portion of the radially outward side surface of the retaining finger.

9. The translation-limiting member of claim 8, further comprising:

a handle disposed at a first end of the shank; and a ball-locking mechanism disposed at a second end of the shank, wherein:

the ball-locking mechanism is configured to lock the shank within the hole; and the coupling feature of the translation-limiting member comprises the ball-locking mechanism.

10. A retaining finger assembly for a retention ring of an assembly fixture, the retaining finger assembly comprising:

a retaining finger slidably engaged at a top surface of the retention ring for radial translation between an extended position and a retracted position, with respect to a center of the retention ring; and a translation-limiting member comprising a coupling feature and a first surface disposed substantially perpendicular to the top surface of the retention ring, wherein:

the coupling feature is configured to couple the translation-limiting member to the retention ring at a location corresponding to the retaining finger; and the first surface is configured to directly abut a second surface of the retaining finger in the extended position and block the radial translation of the retaining finger.

11. The retaining finger assembly of claim 10, wherein the retaining finger comprises a slot extending along a radial length of the retaining finger, and the retaining finger assembly further comprises:

a fastening device configured to slidably couple the retaining finger to the retention ring via the slot, wherein the fastening device comprises a locking screw or a spring-loaded bolt.

12. The retaining finger assembly of claim 11, wherein:

the slot comprises an inner surface; and the translation-limiting member further comprises:

a plate comprising an upper side and a lower side, wherein the lower side is configured to be disposed on a surface of the retaining finger substantially parallel with the top surface of the retention ring; and a protrusion extending from the lower side of the plate and configured to fit within the slot of the retaining finger in the extended position;

wherein the protrusion comprises a first side surface extending substantially perpendicularly from the lower side of the plate, the first surface of the translation-limiting member comprises at least a portion of the first side surface of the protrusion, and the second surface of the retaining finger comprises at least a portion of the inner surface of the slot.

13. The retaining finger assembly of claim 12, wherein a shape of the protrusion corresponds to an exposed portion of the slot with the retaining finger in the extended position.

14. The retaining finger assembly of claim 13, wherein:

the translation-limiting member further comprises an aperture through the plate;

the coupling feature of the translation-limiting member comprises the aperture; and the fastening device couples the plate, the retaining finger, and the retention ring, via the aperture and the slot, with the protrusion disposed within the exposed portion of the slot.

15. The retaining finger assembly of claim 11, wherein the translation-limiting member further comprises:

a plate slidably coupled to the top surface of the retention ring and comprising a radially inward side surface, with respect to the center of the retention ring, wherein:

the plate is configured to slide along a radially outward side surface of the retaining finger in the extended position, with respect to the center of the retention ring;

the first surface of the translation-limiting member comprises at least a portion of the radially inward side surface; and the second surface of the retaining finger comprises at least a portion of the radially outward side surface of the retaining finger.

16. The retaining finger assembly of claim 15, wherein the translation-limiting member further comprises:

at least one lateral slot extending a long a length of the plate; and a sliding fastener disposed through the at least one lateral slot, coupling the plate to the retention ring, wherein:

the coupling feature of the translation-limiting member comprises the sliding fastener and the at least one lateral slot; and the sliding fastener enables sliding movement of the plate on the top surface of the retention ring in a direction substantially perpendicular to the radial translation of the retaining finger.

17. The retaining finger assembly of claim 16, wherein the translation-limiting member further comprises:

a central slot extending along the length of the plate and disposed substantially parallel with the at least one lateral slot; and a spring element comprising a first end and a second end, wherein:

the first end is coupled to the plate, and the second end is coupled to a pin extending from the top surface of the retention ring within the central slot; and wherein the spring element exerts a force enabling the plate to slide along the radially outward side surface of the retaining finger in the extended position.

18. The retaining finger assembly of claim 11, wherein the translation-limiting member further comprises:

a shank comprising a cylindrical surface and configured to fit within a hole in the retention ring, wherein:

the hole is disposed adjacent to a radially outward side surface of the retaining finger in the extended position, with respect to the center of the retention ring;

the first surface of the translation-limiting member comprises at least a portion of the cylindrical surface of the shank; and the second surface of the retaining finger comprises at least a portion of the radially outward side surface of the retaining finger.

19. The retaining finger assembly of claim 18, wherein the translation-limiting member further comprises:

a handle disposed at a first end of the shank; and a ball-locking mechanism disposed at a second end of the shank, wherein:

the ball-locking mechanism is configured to lock the shank within the hole; and the coupling feature of the translation-limiting member comprises the ball-locking mechanism.

20. A retention ring of an assembly fixture for a gas turbine engine, the retention ring comprising:

a top surface having an inner perimeter and an outer perimeter;

a plurality of retaining fingers disposed circumferentially around the top surface and at least partially between the inner perimeter and the outer perimeter, wherein each of the plurality of retaining fingers is slidably engaged with the top surface for radial translation, with respect to a center of the retention ring, between an extended position and a retracted position; and at least one translation-limiting member comprising a coupling feature and a first surface disposed substantially perpendicular to the top surface, wherein:

the coupling feature is configured to couple the translation-limiting member to the retention ring at a location corresponding to a respective retaining finger of the plurality of retaining fingers; and the first surface is configured to directly abut a second surface of the respective retaining finger in the extended position and block the radial translation of the respective retaining finger.

* * * * *